(12) United States Patent
Plastina et al.

(10) Patent No.: US 8,290,820 B2
(45) Date of Patent: Oct. 16, 2012

(54) METHODS OF MAINTAINING A JOURNAL OF MEDIA ENCOUNTERS BETWEEN CO-EXISTING PORTABLE DEVICES

(75) Inventors: Daniel Plastina, Sammamish, WA (US); David Jones, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1579 days.

(21) Appl. No.: 11/549,474

(22) Filed: Oct. 13, 2006

(65) Prior Publication Data

US 2008/0065505 A1    Mar. 13, 2008

Related U.S. Application Data

(60) Provisional application No. 60/844,142, filed on Sep. 13, 2006.

(51) Int. Cl.
*G06Q 30/00* (2006.01)
(52) U.S. Cl. .................. 705/26.1; 455/440; 455/448
(58) Field of Classification Search .................. 705/26, 705/27, 26.1; 455/440, 448
See application file for complete search history.

(56) References Cited

U.S. PATENT DOCUMENTS

| | | | |
|---|---|---|---|
| 6,192,340 B1 | 2/2001 | Abecassis | |
| 6,286,063 B1 * | 9/2001 | Bolleman et al. | ............... 710/62 |
| 6,353,398 B1 | 3/2002 | Amin et al. | |
| 6,507,727 B1 | 1/2003 | Henrick | |
| 6,672,506 B2 | 1/2004 | Swartz et al. | |
| 6,728,729 B1 | 4/2004 | Jawa et al. | |
| 6,741,188 B1 | 5/2004 | Miller et al. | |
| D494,584 S | 8/2004 | Schlieffers et al. | |
| 6,796,505 B2 | 9/2004 | Pellaumail et al. | |
| 6,837,436 B2 | 1/2005 | Swartz et al. | |
| 6,907,315 B1 * | 6/2005 | Hartman et al. | ............... 700/216 |
| 6,957,041 B2 * | 10/2005 | Christensen et al. | ........ 455/3.06 |
| 6,959,285 B2 | 10/2005 | Stefanik et al. | |
| 7,010,263 B1 * | 3/2006 | Patsiokas | ..................... 455/3.02 |
| 7,010,501 B1 | 3/2006 | Roslak et al. | |
| 7,020,704 B1 | 3/2006 | Lipscomb et al. | |
| 7,040,541 B2 | 5/2006 | Swartz et al. | |
| 7,063,263 B2 | 6/2006 | Swartz et al. | |
| 7,072,846 B1 | 7/2006 | Robinson | |
| 7,130,279 B2 * | 10/2006 | Alves et al. | ................... 370/255 |
| 7,171,378 B2 | 1/2007 | Petrovich et al. | |
| 7,195,157 B2 | 3/2007 | Swartz et al. | |
| 7,385,501 B2 | 6/2008 | Miller et al. | |

(Continued)

FOREIGN PATENT DOCUMENTS

CN        1522528 A        8/2004

(Continued)

OTHER PUBLICATIONS

JD Biersdorfer, "Tag, the music is it; Build your song library by playing tag", International Herald Tribune. Paris: Nov. 26, 2009. p. 14.*

(Continued)

*Primary Examiner* — Mark Fadok
(74) *Attorney, Agent, or Firm* — Senniger Powers LLP

(57) ABSTRACT

Creating a journal of media encounters listing media content that was previously provided to a user. Metadata describing the media encounters is used to create journal entries. The journal is presented to the user for interaction. A purchase opportunity for the media content is provided to the user based on the metadata.

16 Claims, 10 Drawing Sheets

U.S. PATENT DOCUMENTS

| | | | |
|---|---|---|---|
| 7,505,974 B2 | 3/2009 | Gropper | |
| 7,525,450 B2 | 4/2009 | Miller et al. | |
| 7,603,406 B2 | 10/2009 | Gulliver et al. | |
| 7,881,315 B2 | 2/2011 | Haveson et al. | |
| 2001/0025259 A1 | 9/2001 | Rouchon | |
| 2001/0030664 A1 | 10/2001 | Shulman et al. | |
| 2002/0029169 A1 | 3/2002 | Oki et al. | |
| 2002/0033844 A1 | 3/2002 | Levy et al. | |
| 2002/0040326 A1 | 4/2002 | Spratt | |
| 2002/0065732 A1 | 5/2002 | Rodgers et al. | |
| 2002/0120564 A1 | 8/2002 | Strietzel | |
| 2002/0132575 A1* | 9/2002 | Kesling et al. | 455/2.01 |
| 2003/0036948 A1 | 2/2003 | Woodward et al. | |
| 2003/0097338 A1* | 5/2003 | Mankovich et al. | 705/64 |
| 2003/0105870 A1 | 6/2003 | Baum | |
| 2003/0110094 A1 | 6/2003 | Gulliver et al. | |
| 2003/0163399 A1 | 8/2003 | Harper et al. | |
| 2003/0182184 A1 | 9/2003 | Strasnick et al. | |
| 2003/0204446 A1* | 10/2003 | Borovoy | 705/26 |
| 2004/0121723 A1 | 6/2004 | Poltorak | |
| 2004/0201500 A1 | 10/2004 | Miller et al. | |
| 2004/0260786 A1 | 12/2004 | Barile | |
| 2005/0021478 A1 | 1/2005 | Gautier et al. | |
| 2005/0055352 A1 | 3/2005 | White et al. | |
| 2005/0071240 A1* | 3/2005 | Ewald | 705/26 |
| 2005/0071375 A1 | 3/2005 | Houghton et al. | |
| 2005/0131837 A1 | 6/2005 | Sanctis et al. | |
| 2005/0210101 A1 | 9/2005 | Janik | |
| 2005/0240494 A1 | 10/2005 | Cue et al. | |
| 2005/0266858 A1 | 12/2005 | Miller et al. | |
| 2005/0272442 A1 | 12/2005 | Miller et al. | |
| 2005/0278377 A1 | 12/2005 | Mirrashidi et al. | |
| 2005/0286546 A1 | 12/2005 | Bassoli et al. | |
| 2006/0015378 A1 | 1/2006 | Mirrashidi et al. | |
| 2006/0019676 A1 | 1/2006 | Miller et al. | |
| 2006/0056324 A1 | 3/2006 | Hyyppa et al. | |
| 2006/0136502 A1 | 6/2006 | Williams et al. | |
| 2006/0168150 A1 | 7/2006 | Naik et al. | |
| 2006/0168351 A1 | 7/2006 | Ng et al. | |
| 2006/0173974 A1 | 8/2006 | Tang | |
| 2006/0218613 A1 | 9/2006 | Bushnell | |
| 2007/0143492 A1 | 6/2007 | Flinchem | |
| 2008/0090591 A1 | 4/2008 | Miller et al. | |
| 2008/0091537 A1 | 4/2008 | Miller et al. | |
| 2008/0161018 A1 | 7/2008 | Miller et al. | |

FOREIGN PATENT DOCUMENTS

| | | |
|---|---|---|
| WO | 2004098079 A1 | 11/2004 |
| WO | 2004102568 A1 | 11/2004 |
| WO | 2005/026916 A2 | 3/2005 |
| WO | 2005/073856 A2 | 8/2005 |

OTHER PUBLICATIONS

Linn Allison, "Microsoft touts shared songs with media player; [Home Edition]'", Associated Press. Journal-Gazette. Ft. Wayne, Ind.: Sep. 18, 2006. p. 8.D.*

Unknown, "Apple iPod Video 5th Generation 30GB Media Player—Black," printed from http://stores.tomshardware.com/search_getprod.php/masterid=12721947/mode=toms_creative_denguru_house_mlink//, printed on Aug. 29, 2006, 4 pages, Crutchfield New Media, LLC & Tom's Guide Publishing, USA.

Bassoli et al., "tunA: Local Music Sharing with Handheld Wi-Fi Devices," Fifth Wireless World Conference, University of Surrey, 23 pages, Jul. 2004, UK.

Unknown, "The Sound of Starbucks," printed from http://www.hearmusic.com/#ABOUT_US, printed on Sep. 19, 2006, 1 page, Starbucks Corporation, USA.

Unknown, "Vision: Listen Without Limits," printed from http://www.musicgremlin.com/About/Vision/visionListen.aspx, printed on Oct. 12, 2006, 2 pages, MusicGremlin, Inc., USA.

Alexander Pazay, ComputerraOn-line, "iMusic", Dec. 16, 2003, see URL: http://www.computerra.ru/compunity/femida/31061/ (found on Apr. 12, 2011, 5 pages in total).

Site Logo, "iTunes v6.0.4.2", May 4, 2006, see URL: http://hrono.ucoz.ru/news/2006-05-04-729 (found on Apr. 12, 2011, 2 pages in total).

* cited by examiner

FIGURE 7

| | TITLE | ARTIST | ALBUM | ACTION | FROM |
|---|---|---|---|---|---|
| FLAGGED ITEMS | | | | | |
| | TALK | COLDPLAY | X&Y | DOWNLOAD | JEETERS |
| | SPEED OF SOUND | COLDPLAY | X&Y | BUY | JEETERS |
| | EDINBURGH CASTLE | MARK LEECE | SCOTTISH VACATION | VIEW IMAGE | MARKY MARK |
| | ATLANTIC | KEANE | UNDER THE IRON SEA | IN LIBRARY | PERSONAL TAG |
| | IS IT ANY WONDER? | KEANE | UNDER THE IRON SEA | IN LIBRARY | PERSONAL TAG |
| NON-FLAGGED ITEMS | | | | | |
| | PAVEMENT CRACKS | ANNIE LENNOX | BARE | DOWNLOAD | MEDIADUDE |
| | VERTIGO | U2 | HOW TO DIS... | DOWNLOAD | MEDIADUDE |
| | WHATSERNAME | GREEN DAY | AMERICAN IDIOT... | SEARCH | MEDIADUDE |
| | SQUARE ONE | COLDPLAY | X&Y | DOWNLOAD | JEETERS |
| | WHAT IF | COLDPLAY | X&Y | DOWNLOAD | JEETERS |
| | WHITE SHADOWS | COLDPLAY | X&Y | DOWNLOAD | JEETERS |
| | FIX YOU | COLDPLAY | X&Y | BUY | JEETERS |
| | X&Y | COLDPLAY | X&Y | DOWNLOAD | JEETERS |
| | A MESSAGE | COLDPLAY | X&Y | BUY | JEETERS |
| | SOMEWHERE ONLY... | KEANE | HOPES AND FEARS | BUY | ANGRY DUENDE |
| | THIS IS THE LAST TIME | KEANE | HOPES AND FEARS | BUY | ANGRY DUENDE |
| | BEND & BREAK | KEANE | HOPES AND FEARS | DOWNLOAD | ANGRY DUENDE |
| | WE MIGHT AS WELL... | KEANE | HOPES AND FEARS | DOWNLOAD | ANGRY DUENDE |
| | EVERYBODY'S CHANGING | KEANE | HOPES AND FEARS | BUY | ANGRY DUENDE |
| | YOUR EYES OPEN | KEANE | HOPES AND FEARS | DOWNLOAD | ANGRY DUENDE |

Sidebar:
- JOURNAL
- PLAYLISTS
- JOURNAL
- MUSIC
- RADIO
- MARKETPLACE
  - HOME
  - PLAYLISTS
  - CHARTS
  - ARTISTS
  - ALBUM
  - SONGS
  - GENRE
  - YEAR
  - DOWNLOAD MANAGER
- CD/DVD
- MEDIA SERVICE

702

METHODS OF MAINTAINING A JOURNAL OF MEDIA ENCOUNTERS BETWEEN CO-EXISTING PORTABLE DEVICES

CROSS-REFERENCE TO RELATED APPLICATION

This application claims the benefit of U.S. Provisional Application No. 60/844,142, filed Sep. 13, 2006, the entirety of which is hereby incorporated by reference herein for all purposes.

BACKGROUND

Digital media content such as audio, video, and images may be consumed by a user on a variety of devices such as personal computers, personal digital assistants, portable digital media players, gaming consoles, mobile telephones, and the like. The digital media content may be shared by users via a peer-to-peer network or a centralized file-sharing network.

Existing systems fail to provide a record of the users' experiences with the digital media content and with other users. For example, existing media players may list the digital media content that has been rendered recently to the user. These existing media players, however, fail to list the users' experiences and encounters with other users. In addition, the existing media players do not allow users to take meaningful action on the listed media content, other than to render the content again.

SUMMARY

Embodiments of the invention create a journal of media encounters. In particular, metadata describing the media encounters by a user is stored on a computing device. Journal entries such as records are created, based on the metadata, for each of the media content items experienced during the media encounters. The journal entries are presented to a user for interaction. The journal entries include actionable elements that provide, in part, an opportunity to the user to purchase the media content items.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 7 is an exemplary screen shot of a user interface illustrating a media content items sorted according to flagged or non-flagged status.

Corresponding reference characters indicate corresponding parts throughout the drawings.

DETAILED DESCRIPTION

Figure 1:
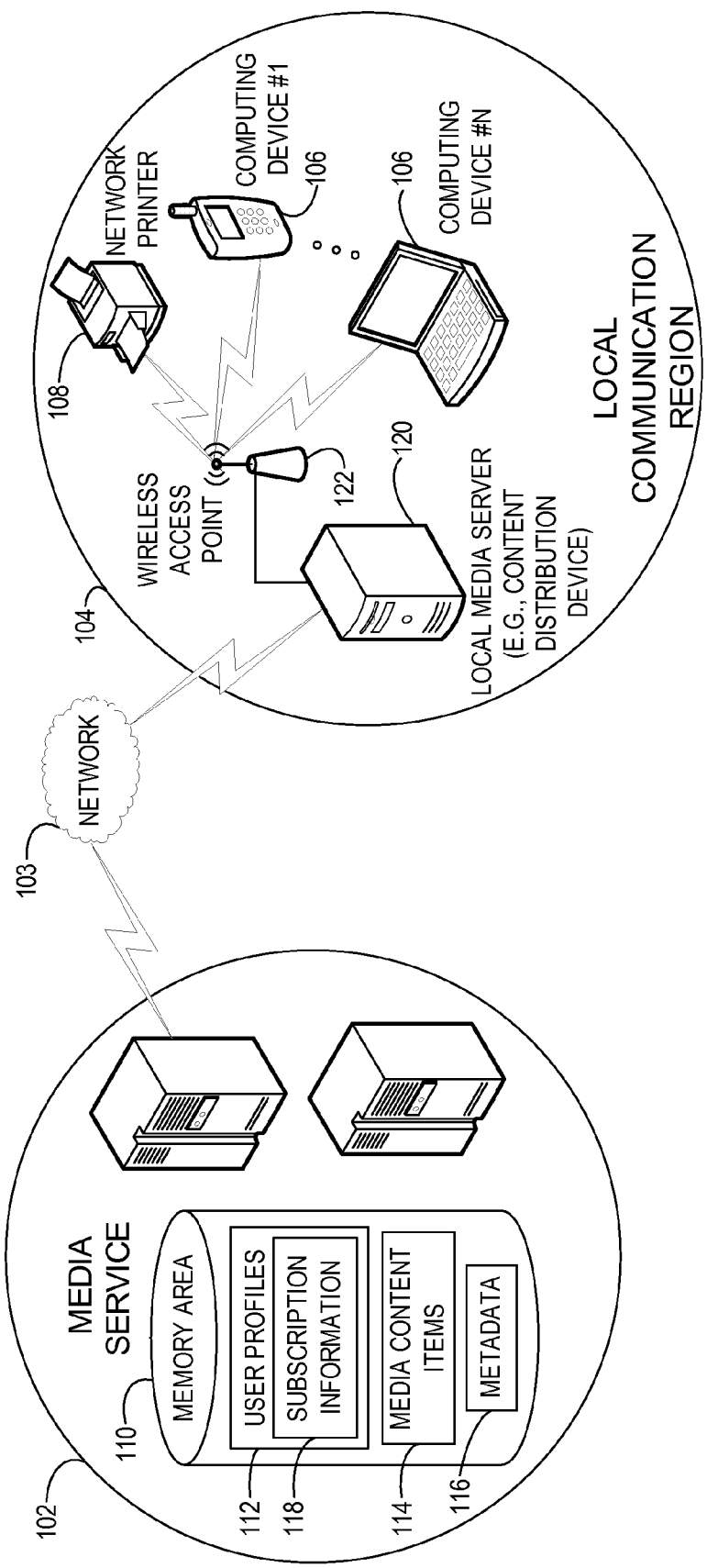
FIG. 1 is an exemplary block diagram illustrating a media service interacting with a local network.

Embodiments of the invention enable a user to review, purchase, flag, or otherwise manipulate digital media content received from a media system such as illustrated in FIG. 1. In an embodiment, the invention provides a journal for displaying metadata describing media encounters experienced by the user. Actions may be performed upon the journal entries such as purchasing the media content and reviewing, flagging, and deleting entries. In addition, the journal itself or a portion thereof may be sent to another user.

Referring first to FIG. 1, an exemplary block diagram illustrates a media service 102 interacting with a local communication region 104 via a network 103. In an embodiment, the local communication region 104 is a wireless network located, for example, at a retail establishment such as a coffee shop or airport. Users connect to the local communication region 104 via computing devices 106 to initiate or renew subscription licenses to the media service 102, access promotional content, update playlists, purchase media content, play games, and the like. Users may also use the local communication region 104 to access third party resources supported by an operator of the local communication region 104. The resources may include, for example, printing photographs or other data directly from the user's computing device 106 on a local network printer 108, accessing the Internet, and projecting photographs and/or video to a wireless projector or display at the retail establishment.

The media service 102 in FIG. 1 provides media content and related services to local communication regions such as local communication region 104. Users subscribe to the media service 102 to have access to the services offered by the media service 102. Subscribers to the media service 102 may pay a monthly or yearly fee for access to the media service 102. Alternatively, a pay-as-you-go model may be employed in which users pay on a per-transmission basis for access and connection to the media service 102. In yet another embodiment, the media service 102 is supported entirely or in part by advertisements inserted into transmissions from the media service 102.

The media service 102 includes a memory area 110 storing user profiles 112, media content items 114, and associated metadata 116. The user profiles 112 include subscription information 118 describing the user's subscription to the media service 102 (e.g., renewal dates and type of subscription). The media content items 114 include, but are not limited to, audio, video, and still images (e.g., full- or partiallength songs and movies, video clips or shorts, recorded television, and product commercials). In an embodiment, each of the media content items 114 each has a digital rights management policy associated therewith. In such an embodiment, transmitting the media content items 114 to the computing device 106 includes transmitting the media content items 114 with the associated digital rights management policy associated therewith to the computing device 106. A component of the digital rights management policy may direct, for example, that the transmitted media content items 114 are to be deleted or otherwise not renderable after a particular date (e.g., an expiration date). While the media content items 114 may be deleted, however, the metadata 116 associated with the media content items 114 is not deleted and remains to enable the user to purchase the media content items 114. The metadata 116 may be used as a subsequent purchase opportunity for the user to purchase the shared media content items 114.

The metadata 116 describes the media content items 114 and includes, for example, information related to album, artist, title, track, and album art. While metadata 116 is described and shown as separate from the media content items 114 in FIG. 1, some of the metadata 116 may be part of the media content items 114 (e.g., stored in a header). Further, while FIG. 1 illustrates the media content items 114 and metadata 116 as being stored in the memory area 110 local to the media service 102, the media content items 114 and metadata 116 may be stored remotely from the media service 102 and be part of a third-party system. In such an embodiment, the media service 102 has a relationship with, and access to, the third-party system to provide the media content items 114 to the local communication region 104. In addition, the metadata 116 may be augmented or supplemented when the media content items 114 are provided to the computing device 106 (e.g., with transaction details such as date and time of rendering).

The exemplary local communication region 104 illustrated in FIG. 1 includes a local media server 120 (e.g., a content distribution device) connected to the network 103 and to one or more wireless access points 122. The network 103 links the local communication region 104 to the media service 102 and, in an embodiment, to a wide area network such as the Internet. The local media server 120 includes software for connecting to the media service 102, software for connecting with computing devices 106, and, in an embodiment, a local copy of a content catalog downloaded from the media service 102. The content catalog reflects the media content items 114 that are available from the media service 102. Devices connect to the wireless access point 122 when within the local communication region 104. Exemplary devices include computing devices 106 such as computing device #1 through computing device #N, and the network printer 108. Exemplary computing devices include a mobile telephone, a personal data assistant, a portable digital media player, a laptop, and a personal computer. The computing devices 106 include any device, or any physical or logical element of such a device, separate from or included in other devices.

The local communication region 104 corresponds to any zone or network such as a media service access zone, local area network, wide area network, or personal area network, and may include any number of devices therein. For example, the local communication region 104 may include only two computing devices 106 (see FIG. 5). Wide area networks and local area networks are widely known. The personal area network represents any technology or system usable for direct communication between the computing devices 106 close to a particular person, device, or entity. An access point such as the wireless access point 122 may be part of such communication in an embodiment, but is not required to enable such communication in other embodiments. Personal area network technologies or systems may be used to connect to other local area networks or wide area networks. The reach of a personal area network may be a few meters. In an embodiment, the personal area network employs a wireless cable replacement technology. Wireless cable replacement technologies are generally identified by the air interface protocols used for communication between computing devices 106. Existing air interface protocols include BLUETOOTH, Wireless USB, and various proprietary protocols. Such air interface protocols may also be used to create wireless cable replacement topologies.

The local media server 120 in FIG. 1 includes a processor configured to execute computer-executable instructions for connecting the computing devices 106. In an embodiment, the processor operates to detect one of the computing devices 106 when the computing device 106 enters the local communication region 104 or otherwise comes within a predefined proximity of the local media server 120 or the wireless access point 122. The local media server 120 establishes a wireless connection to the detected computing device 106 and receives a user identifier from the connected computing device 106. The user identifier is used by the local media server 120 to authenticate, or enable the media service 102 to authenticate, the user of the computing device 106. Authentication includes, for example, checking the subscription information 118 or other user profile information stored in the memory area 110 of the media service 102 for the received user identifier. After authentication, the user has access to the media service 102 (e.g., media content items 114) and to one or more of the local services offered by the operator (e.g., printing). In an embodiment, the user has access to only the services offered by the media service 102 that have been paid for by the user (e.g., as specified in the user profile 112) and any additional services offered by the operator of the local communication region 104.

While connection of the computing device 106 and authentication of the user occurs automatically in an embodiment, such connection and authentication may occur only in response to a specific request from the user in other embodiments. In such embodiments, the operator broadcasts a list of services available within the local communication region 104. Responsive to a request from the user to connect, the local media server 120 connects to the computing device 106, authenticates the user, and provides access to the media service 102 and any available local services.

The local media server 120 further operates to provide access, based on the authentication status of the user (e.g., successfully authenticated or not), to the memory area 110 associated with the media service 102 for the particular user to update the subscription information 118 stored in the user profile 112 associated with the particular user, or access any other service offered by the media service 102. The local media server 120 also provides one or more of the media content items 114 and associated metadata 116 from the media service 102 to a computer-readable medium associated with the computing device 106. The one or more of the media content items 114 are selected by the operator of the local communication region 104 based on customer demand (e.g., interest, demographics, etc.). The selected media content items 114 are provided to the computing device 106 with a digital rights management policy associated therewith. For example, the policy allows three renderings of each of the media content items 114 over three days, before the media content items 114 are erased from the computing device 106 or otherwise rendered unplayable.

Aspects of the invention provide a subsequent purchase opportunity to the user to purchase the media content items 114 sent to the computed device. The purchase opportunity may occur, for example, when the user subsequently connects the computing device 106 to the Internet and views the metadata 116 associated with the provided media content items 114. The purchase opportunity occurs within in the local communication region 104, or outside the boundaries of the local communication region 104.

The operator or provider of the local communication region 104 (e.g., a retail establishment) provides access to the media service 102 for customers of the operator by acquiring a business subscription to the media service 102. Such a subscription enables the operator to uniquely brand the local communication region 104 (e.g., Joe's Coffee Shop Media Access Zone) for marketing purposes. For example, when a user enters the local communication region 104, the operator name and branding appear on the user's computing device 106. In an embodiment, the operator shares media content from the media service 102 to connected computing devices 106. The sharing may occur by streaming the media content where, upon receipt (e.g., within the predefined proximity), the computing device 106 renders the streamed media content to the user. Alternatively or in addition, the sharing may occur by downloading the media content to the computing device 106. By subscribing to the media service 102, the operator no longer needs to store local copies of the media content (e.g., compact discs, digital versatile discs) in an embodiment. Further, with access to the large repository of media content items 114 from the media service 102, the operator may offer a large variety of content to entice customers to visit or enter the local communication region 104. For example, the operator may target customers with selected media content (e.g., jazz music at a coffee shop, easy listening music at a winery, new age music at a candle shop, alternative rock at a snowboard store).

In addition, the operator is credited with a portion of the sale proceeds or otherwise rewarded by the media service 102 if the user subsequently purchases any of the downloaded media content items 114. This may be accomplished by associating an identifier with the operator, and including this identifier with the media content items 114 downloaded to the user's computing device 106. During a purchase opportunity (e.g., when the computing device 106 is connected to another computing device 106 such as a personal computer), the user views the metadata 116 associated with the downloaded media content items 114 and has the ability to purchase any of the media content items 114. In purchasing the media content items 114, the metadata 116 associated with the desired media content items 114 is sent to the media service 102 along with the identifier of the operator of the local communication region 104 in which the promotional media content items 114 were downloaded to the user's computing device 106. In this manner, the operator is identified and rewarded by the media service 102 for introducing the user to the purchased media content items 114.

Alternatively or in addition, the operator may transmit advertisements to the connected computing devices 106 within the local communication region 104. The advertisements may be designed for rendering, for example, before the content is consumed (e.g., at the beginning of music playback), after rendering completes, or at connection time. For example, when the user connects to the local communication region 104, the operator inserts a media advertisement that is presented to the user before the list of available services is displayed to the user. In another example, when the user selects an available service, the operator inserts a media advertisement that is presented to the user before the selected service is provided. In yet another example, the operator may insert advertisements at any point in the streaming or downloading of the media content to the computing device 106. Alternatively or in addition, the operator of the local communication region 104 may upload or otherwise identify selected media content items 114 to the media service 102. The media service 102 then makes the selected media content available at all or selected local communication regions related to the operator (e.g., all company-owned stores, or franchised locations).

Figure 2:
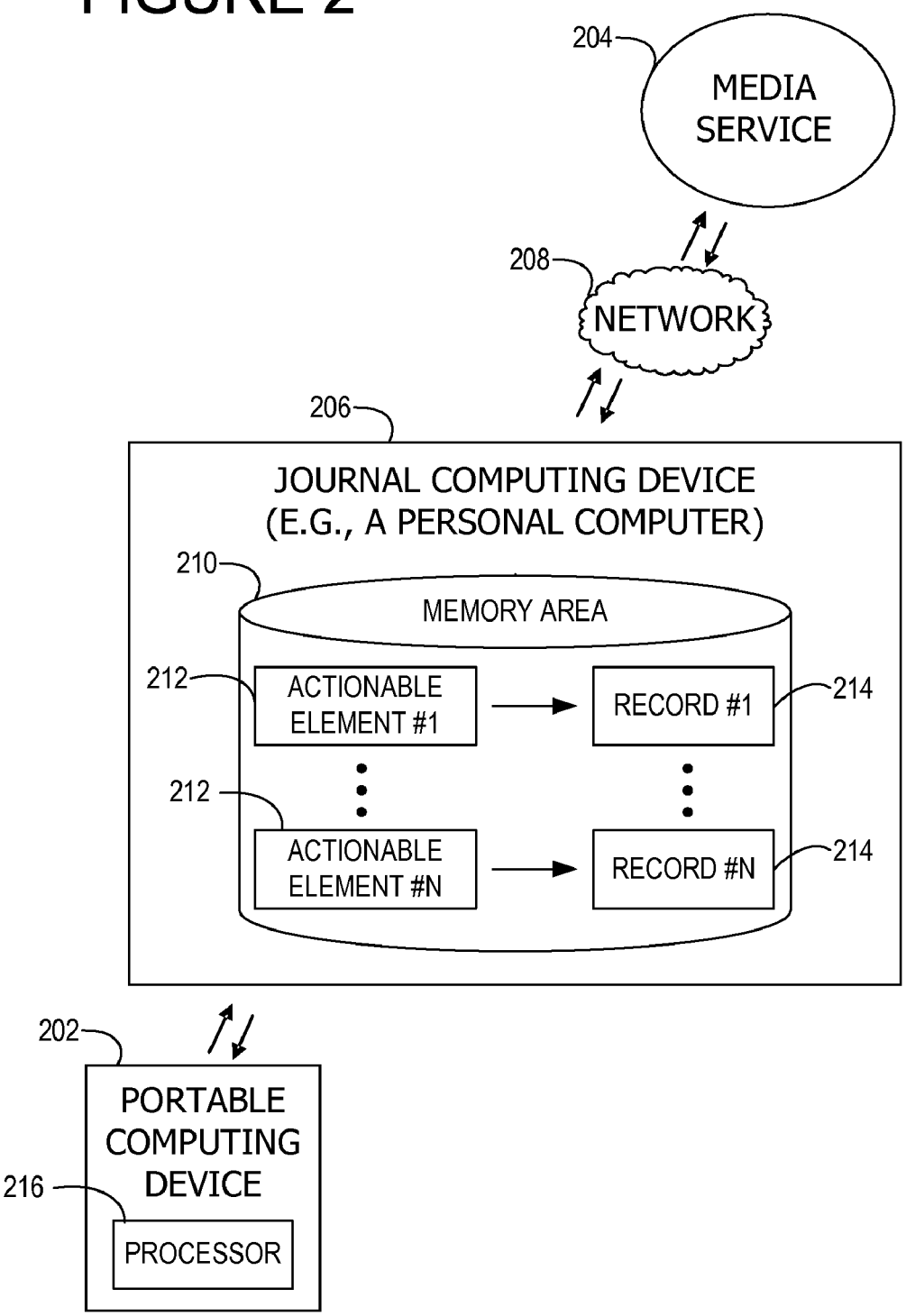
FIG. 2 is an exemplary block diagram illustrating communication between a portable computing device, a journal computing device, and the media service.

Referring next to FIG. 2, an exemplary block diagram illustrates communication between a portable computing device 202 and a media service 204 via a journal computing device 206 and a network 208 in a media purchasing system. For example, the portable computing device 202 represents a portable digital media player and the journal computing device 206 represents a personal computer. Such a configuration occurs when the user of the portable computing device 202 leaves a local communication region such as in FIG. 1 and connects the portable computing device 202 to the journal computing device 206. While in the local communication region receiving media content items, a process executing on the portable computing device 202 records metadata representing a log of all rendered media content items including streamed content, downloaded content, broadcast radio content, and satellite content. Transaction details such as date and time of play are also recorded.

The metadata received by the portable computing device 202 from the media service 204 (or a peer device) while in the local communication region (e.g., FIG. 1) is synchronized with the journal computing device 206. The metadata is stored on the portable computing device 202 until synchronization.

The journal computing device 206 presents the synchronized metadata to the user for selection, for example, in a rich user interface. The journal computing device 206 connects to the media service 204 via a network 208 such as the Internet. In this manner, the user may purchase, via the journal computing device 206, any of the promotional media content items previously downloaded or streamed from the media service 204. Alternatively or in addition, the portable computing device 202 may establish a connection with the media service 204 exclusive of the journal computing device 206, and purchase selected media content items directly.

The journal computing device 206 includes a memory area 210. The memory area 210 stores the synchronized metadata as a plurality of records 214 such as record #1 through record #N. The records 214 comprise a journal, a history, or the like. Each of the plurality of records 214 corresponds to a media content item previously provided to the user during communication between the portable computing device 202 of the user and a content distribution device. The memory area 210 further stores actionable elements 212 such as actionable element #1 through actionable element #N. Each of the actionable elements 212 corresponds to one of the plurality of records 214. The actionable elements 212 link each of the records 214 to the media service 204 offering the corresponding media content items for purchase. In an embodiment, the actionable elements 212 include a portion of each journal entry (e.g., the title, artist name, icon, or the like) or the entire journal entry (e.g., the entire row of metadata identifying the media content item). For example, the actionable element 212 includes a hyperlinked title of a particular song.

The metadata transmitted with the media content items describes the media content items and describes the transaction. Such metadata includes, but is not limited to, album, artist, title, track, and album art. Further, the metadata includes information about the distribution of the media content items such as a date and time associated with transmission of the media content item to the portable computing device 202, the parties (e.g., portable computing device 202 and the content distribution device) involved in the transmission, identification of the media content items transferred with a particular media content item, identification of a local communication region where the transmission took place, and the like. The metadata is used to select media content items for purchase as well as to identify the party responsible for the promotional transmission of the media content item (e.g., to reward or give feedback to the responsible party). The metadata may be stored with the media content items or stored separately (e.g., in a different folder).

In operation, a processor 216 associated with the portable computing device 202 is configured to execute computer-executable instructions for communicating with the content distribution device (e.g., a peer device) upon entering a local communication region having the content distribution device therein. The media content items and associated metadata are provided to the portable computing device 202 by the content distribution device during the communication. The processor 216 further executes computer-executable instructions for connecting to the journal computing device 206 outside of the local communication region and synchronizing the associated metadata with the journal computing device 206. The processor 216 further executes computer-executable instructions for receiving a license to render one or more of the media content items associated with the metadata and for rendering at least one of the media content items to the user.

Figure 3:
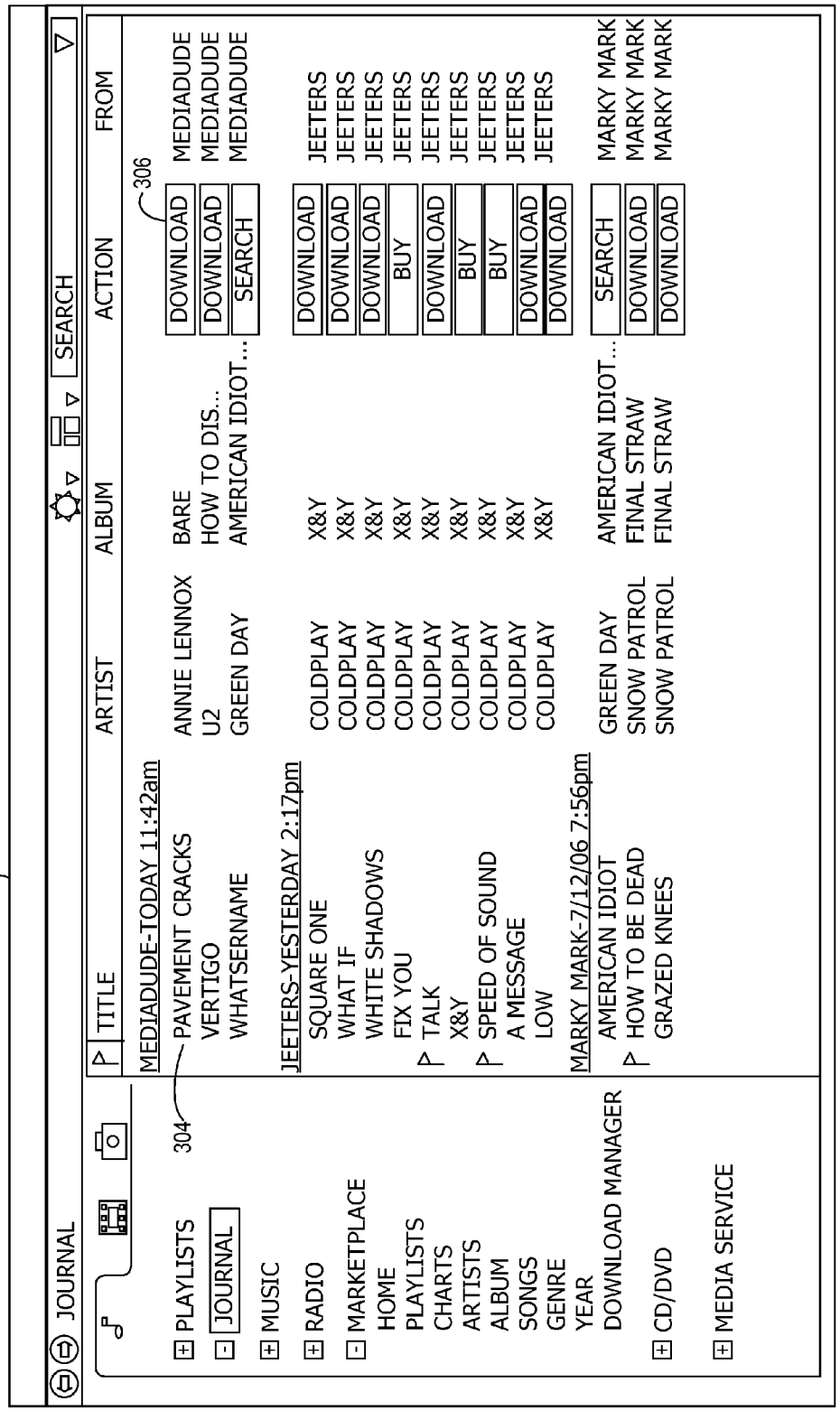
FIG. 3 is an exemplary screen shot of a user interface illustrating metadata describing a plurality of media encounters.

Referring next to FIG. 3, an exemplary screen shot of a user interface 302 illustrates metadata describing a plurality of media encounters. In an embodiment, the user interface 302 corresponds to a journal within a media player. The user interface 302 may be presented within the context of any application program including, for example, an Internet browser, and may also be presented as a standalone application program.

The user interface 302 in FIG. 3 lists the media content items as journal entries such as journal entry 304 shared by users during media encounters. In this example, the user had encounters with Mediadude, Jeeters, and Marky Mark. Mediadude shared songs by Annie Lennox, U2, and Green Day. Jeeters shared songs by Coldplay. Marky Mark shared songs by Green Day and Snow Patrol. Some of the songs have been flagged by the user (e.g., as songs of particular interest) such as "Talk" and "Speed of Sound" by Coldplay. The flag defines the particular media content items as being of highest value for follow up. For example, media sent from a friend that has been reviewed and enjoyed by the user is flagged by the user.

The contents of each column in the user interface 302 describe each journal entry, permit sorting and grouping, and act as actionable elements. The user interface 302 of the journal may be altered or pivoted to show various views based upon a selection of the columns (e.g., sorting). Exemplary columns are described in Table 1 below.

TABLE 1

Exemplary Columns in the Journal User Interface.

| | |
|---|---|
| Flag icon | Flag icon (shown if flag is set) |
| Track # | Track number of media content item if available |

TABLE 1-continued

Exemplary Columns in the Journal User Interface.

| | |
|---|---|
| Date | Date and time of the encounter |
| Title | Title of media content item |
| Artist (Display artist) | Artist associated with media content item |
| Album | Album associated with media content item |
| Action | Action column (e.g., Buy, Download, View Image, Search) |
| From | Person who sent you the encounter or personal tag |
| To | Name of the device and/or user receiving the media content item |
| Group Title | Playlist name |

Actionable elements in the user interface 302 include the items in the Action column such as Download 306. Alternatively or in addition, the actionable elements include all or part of each journal entry. In an embodiment, the contents of the artist and album columns include hyperlinks. For example, if the user clicks on an artist name, the media player displays the corresponding web page for the artist. If the user clicks on an album name, the media player displays the corresponding web page for the album name.

A purchase opportunity is provided for several of the songs as shown in the Action column. The "download" action indicates that the particular media content item was streamed to the user's device, and a copy is available for purchase and downloading. The "buy" action indicates that a local copy (e.g., promotional copy) of the particular media content item is stored on the user's computing device, but the digital rights management information associated with the particular media content item indicates that a non-promotional copy of the particular media content item has not been purchased by the user. The "search" action indicates that the particular media content item has not been identified to a point where a copy may be located. Alternatively, the "search" action indicates that a copy of the particular media content item is not available for purchase from the media service.

In the exemplary user interface 302 of FIG. 3, the title, artist, and album for each media content item is shown, along with the available action and identification of the user from which the media content item was experienced. In an embodiment (not shown), the user interface 302 also displays the devices from which the media content items were received during each media encounter. The information in the user interface 302 comprises the metadata received from the portable computing device, as well as metadata from a subscription service or publisher to supplement the received metadata.

In general, the user performs various operations on the media content items from within the journal. For example, the user reviews received promotional media data (e.g., grouped by sender, date, or time), reviews streaming sessions (e.g., grouped by broadcaster, date, or time), and reviews "flagged" items (e.g., items that the user marked for future action). For each media content item, the operations include previewing a short clip of the item if a copy of the item is available to the user, purchasing and/or downloading a copy of the item, viewing received visual media (e.g., pictures or video) associated with the item, adding or removing a flag from the item, deleting a journal entry, rating each media content item, and searching for items not available from the media service to enable the user to easily purchase a copy.

In an embodiment (not shown in FIG. 3), the user interface 302 displays a current quantity of journal entries, flagged items, downloaded media content items, purchased media content items, and searches performed for media content items.

Figure 4:
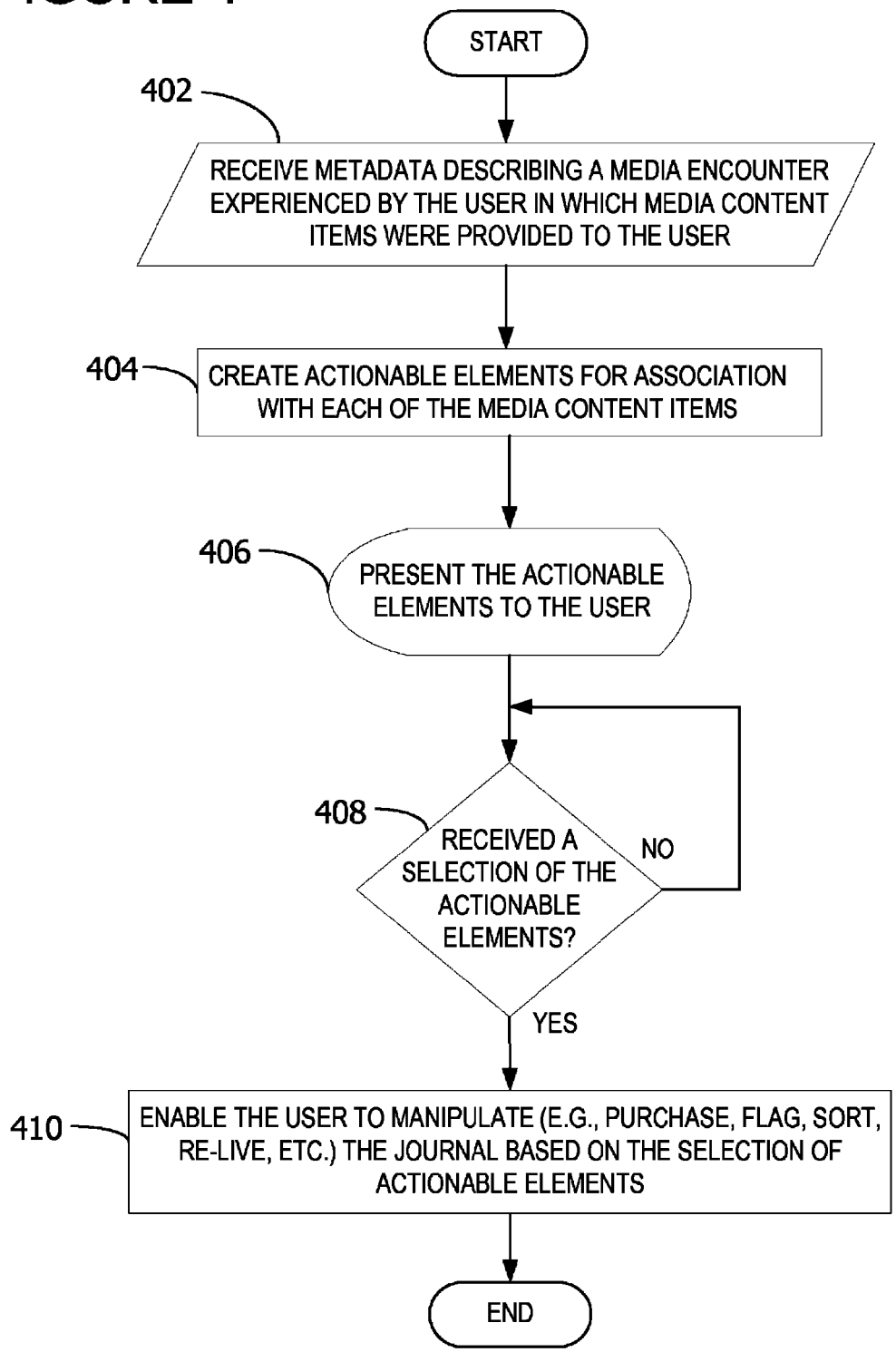
FIG. 4 is an exemplary flow chart illustrating creation of a journal of media encounters.

Referring next to FIG. 4, an exemplary flow chart illustrates creation of a journal of media encounters. Creating the journal documents the media encounters of a user and promotes the purchase of the media content shared during the media encounters. At 402, metadata is received from a computing device associated with a user. The metadata describes at least one media encounter experienced by the user. The media encounter represents a communication between the computing device and another computing device during which one or more media content items were exchanged between the computing devices.

A plurality of actionable elements (e.g., records, journal entries, or the like) are created at 404 for association with each of the media content items previously exchanged. The created actionable elements collectively form a journal of media encounters, and provide the user with an opportunity to purchase the media content items. The actionable elements are presented to the user at 406. Upon receipt of a selection of the actionable elements at 408, the journal and/or media content items corresponding to the selected actionable elements are manipulated accordingly at 410.

As an alternative to selecting actionable elements at 408, the user may select a particular media encounter. Journal entries corresponding to the selected media encounter are identified and the associated media content items are provided to the user for rendering. In this manner, the user is able to re-live the selected media encounter. For example, the user may want to re-live an event or just the passage of a particular day.

In an embodiment, the actionable elements and related information created at 404 are persisted as records in a database table. For example, if an entire album was received during a media encounter, the table includes individual records for each of the album tracks, with each record having the same group identifier value (e.g., JournalGroupID) to indicate a relation between the records. In addition, the album title is stored in each record (e.g., in a JournalGroupName field). If a playlist was also received, the playlist name is stored in another field. Software in aspects of the invention use the identifiers associated with each of the records in the table to match content to a media library of the computing device and the service. An exemplary schema for storing the records is shown in Table 2 below.

TABLE 2

Exemplary Journal Schema.

| FIELD NAME | DESCRIPTION |
| --- | --- |
| JournalKey | Uniquely identifies record in table (primary key) |
| TrackingID | Uniquely identifies media item on computing device |
| JournalOwnerMediaCardKey | MediaCardKey of owner |
| JournalSourceMediaCardKey | MediaCardKey of source. Value is zero for personal flagged items. |
| JournalGroupID | Entries in same group share same ID. Values increment chronologically. |
| JournalGroupType | Group type (e.g., Album = 1, Play list = 2, Personal Flag = 3, DJ session = 4) |
| JournalGroupName | Group name (e.g., name of play list, album title, etc.) |
| JournalTimeStamp | Date and time of when event occurred on the device, or the sync date and time if the corresponding device's timestamp value is invalid. |
| JournalFlagged | Whether the item was 'flagged' on the device. |
| JournalServiceContentID | Service Content ID (e.g., track ID) |
| JournalServiceProviderID | Service Provider ID |
| JournalAMGContentID | AMG content id (e.g., 'A_234; P_453; T_342') |
| WMContentID | Media service content ID (e.g., track) |
| TrackNumber | Inline track number |
| Title | Inline title |
| Artist | Inline author/artist |
| AlbumArtist | Inline album artist |
| AlbumTitle | Inline album title |

Embodiments of the invention may be implemented with computer-executable instructions performing operations such as illustrated in FIG. 4. The computer-executable instructions may be organized into one or more computer-executable components or modules. Aspects of the invention may be implemented with any number and organization of such components or modules. Generally, program modules include, but are not limited to, routines, programs, objects, components, and data structures that perform particular tasks or implement particular abstract data types. For example, aspects of the invention are not limited to the specific computer-executable instructions or the specific components or modules illustrated in the figures and described herein. Other embodiments of the invention may include different computer-executable instructions or components having more or less functionality than illustrated and described herein. Computer-executable instructions implementing aspects of the invention may be separate from, or included with, other computer-executable instructions executed by the computing device. For example, aspects of the invention may be implemented within a media player executing on the computing device, or as a separate program executing on the computing device.

Figure 5:
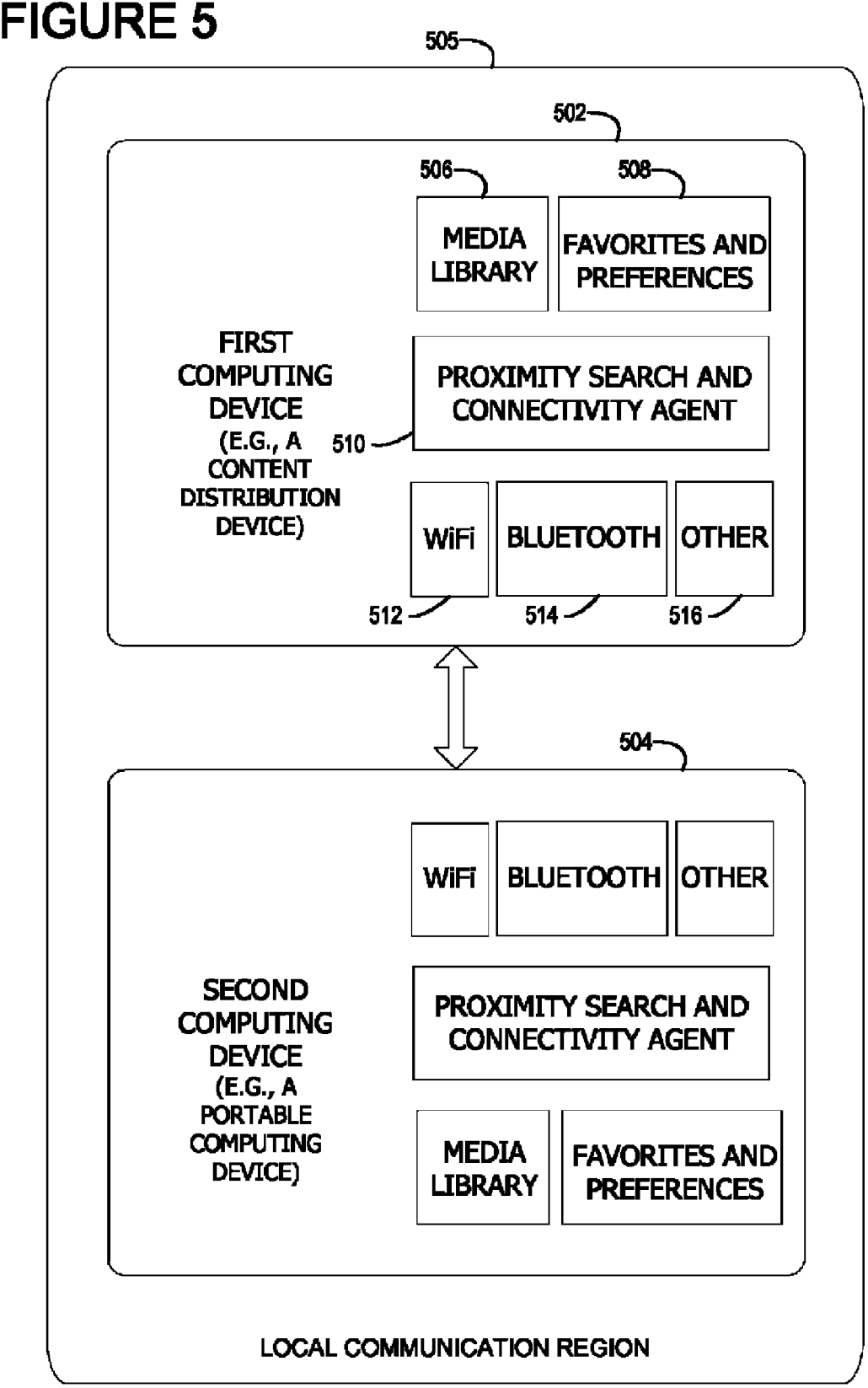
FIG. 5 is an exemplary block diagram illustrating a peer-to-peer connection between two computing devices within a local communication region.

Referring next to FIG. 5, an exemplary block diagram illustrates a peer-to-peer connection between two computing devices 502, 504 within a local communication region 505. In particular, a first computing device 502 (e.g., a content distribution device) associated with a first user establishes a peer-to-peer connection with a second computing device 504 (e.g., a portable computing device) associated with a second user. The peer-to-peer communication session represents any local, peer-to-peer physical or virtual connection between the computing devices 502, 504. The connection may be wired, wireless, or any combination thereof, and may be implemented by one or more communication protocols and/or bridging techniques for enabling communication between various protocols. Aspects of the invention as described herein are not limited to any specific protocols or network layers, but are compatible via an abstraction layer (such technique is known in the art) to support any protocol or network layer.

The first computing device 502 has a media library 506, a list of favorites and preferences 508, a proximity search and connectivity agent 510, and interfaces for connecting to other devices via, for example, wireless fidelity (WiFi) 512, BLUETOOTH 514, and other protocols or network layers 516. The media library 506 identifies the media content items stored on the first computing device 502. In an embodiment, the media library 506 is capable of resolving digital license issues such as transparently obtaining suitable license rights to playback content received during a proximity distribution transaction. The second computing device 504 has a similar set of components. Both the first and second computing devices 502, 504 broadcast their availability for media sharing connections and scan for available devices (e.g., via the proximity search and connectivity agents such as proximity search and connectivity agent 510).

The first user and second user each identify digital content distribution criteria or otherwise determine what media content to share with which other users. This information is stored, for example, in the favorites and preferences components (e.g., favorites and preferences 508). Examples of digital content distribution criteria include, but are not limited to, information regarding one or more of the following: listening habits; purchasing habits; ratings; user-defined favorites; recently purchased content; user profiles (e.g., personal information such as name, address, gender, and age); service profiles (e.g., whether a user has opted-in to participation local, peer-to-peer distribution transactions and opt-in conditions, if any); user affiliations (e.g., buddy lists); device-gathered location information; digital rights management information associated with the media content items (e.g., whether a user has the right to distribute a particular media content item, or any restrictions on such rights); and other data. The digital content distribution criteria may be combined (e.g., via Boolean operands) to create expressions for evaluation when determining whether to share media content items with a particular user. The digital content distribution criteria may also include or be affected by other criteria such as remaining memory storage and battery life of the device (e.g., do not accept large songs, and do not exhaust the battery by accepting content if the battery level is low). The set of media content items to be shared may be user-defined, auto-generated based on other factors (e.g., listening habits), or a combination of both.

The first and second computing devices 502, 504 each continually or continuously scan to detect devices within a predefined proximity. In an implementation, detecting another computing device includes implementing one or more features of a local networking service defined by the Universal Plug and Play peer-to-peer connectivity architecture ("UPNP Architecture"). Alternatively or in addition, detecting the computing device includes implementing one or more features of a service defined by the Web Services Dynamic Discovery ("WS-Discovery") protocol. This protocol defines how services are discovered (e.g., by a simple network access protocol) on a local network. Other implementations are also possible, such as customized BLUETOOTH profiles, and Zero Configuration Networking ("ZeroConf") techniques.

In an embodiment, detecting another computing device includes discovering, and determining the proximity of, potential participants a communication session. Proximity determination includes one or more acts, criteria, or the like for determining whether two computing devices such as computing devices 502, 504 are available for communication (e.g., within a predefined proximity or distance). Proximity may be defined as broadly or narrowly as desired, encompassing everyone/every device or only select entities or devices. Proximity may be determined on a periodic basis, and may result in identification of a set of proximate devices and/or entities. In an embodiment, the boundaries of the local communication region 505 define the limits of the predefined proximity. For example, whenever the two computing devices 502, 504 are within the local communication region 505, proximity is deemed to exist.

In another example, proximity is deemed to exist when two or more computing devices such as computing devices 502, 504 are within static or dynamic physically definable sub-regions of the local communication region 505. Examples of static, physically definable sub-regions of the local communication region 505 include particular geographical regions such as departments of retail locations (e.g., music sales departments), streets, or buildings. An example of a dynamic, physically definable sub-region of the local communication region 505 includes a predetermined maximal distance between two computing device 502, 504. Various commercially available systems and/or products may be used for location determination. Such systems and/or products are generally based on technologies such as global positioning system (GPS) technology, triangulation technology, signal strength analysis technology, time-distance-of-arrival technology, or the like.

Other circumstances under which two or more computing devices may be deemed to be in proximity are defined by one or more logical relationships between the computing devices. For example, two computing devices 502, 504 within the local communication region 505 or sub-regions thereof that have predetermined zip codes, genders, ages, preferences (e.g., music preferences), friends, or other logically relatable characteristics may be deemed to be in proximity.

After detecting each other, the first and second computing devices 502, 504 each play a particular role in an exemplary transaction. For example, the first computing device 502 may take the role of a publisher agent and expose a set of media content items from the media library 506 of the first user. The second computing device 504 may take the role of a recipient agent. The first computing device 502 (e.g., publisher agent) selects one or more media content items from the media library 506 based on the substance of the favorites and preferences component in the second computing device 504 (e.g., an evaluation of the digital content distribution criteria in the second computing device 504). For example, the first computing device 502 receives the digital content distribution criteria from the second computing device 504 upon establishing the peer-to-peer connection. Media content items from the media library 506 in the first computing device 502 that satisfy the criteria from the second computing device 504 are identified and transferred to the second computing device 504 over the established peer-to-peer connection. In addition, metadata describing the transferred media content items and describing the transaction are sent to the second computing device 504. For example, the metadata may specify that a particular song came from John's media library, and was purchased by John from ACME Music Service.

The interaction described with reference to FIG. 5 is repeated as the first and second computing devices 502, 504 individually move from one local communication region 505 to another. The criteria defined in the favorites and preferences components (e.g., favorites and preferences 508) of the two computing devices 502, 504 may be met by other devices in some local communication regions, and not met in others.

FIG. 5 shows one example of a general purpose computing device (e.g., first computing device 502 or second computing device 504) having one or more processors and a system memory. The computing device typically has at least some form of computer readable media. Computer readable media, which include both volatile and nonvolatile media, removable and non-removable media, may be any available medium that may be accessed by the computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. The modulated data signal has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Aspects of the invention include the computing device itself (e.g., computing device 502 or computing device 504) when programmed according to the methods and techniques described herein.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environments. Examples of well known computing systems, environments, and/or configurations that may be suitable for use with aspects of the invention include, but are not limited to, personal computers, server computers, hand-held or laptop devices, personal digital assistants, multiprocessor systems, microprocessor-based systems, set top boxes, programmable consumer electronics, digital broadcast television recording devices, portable digital media players, gaming consoles, mobile telephones, network PCs, minicomputers, mainframe computers, distributed computing environments that include any of the above systems or devices, and the like.

Figure 6:
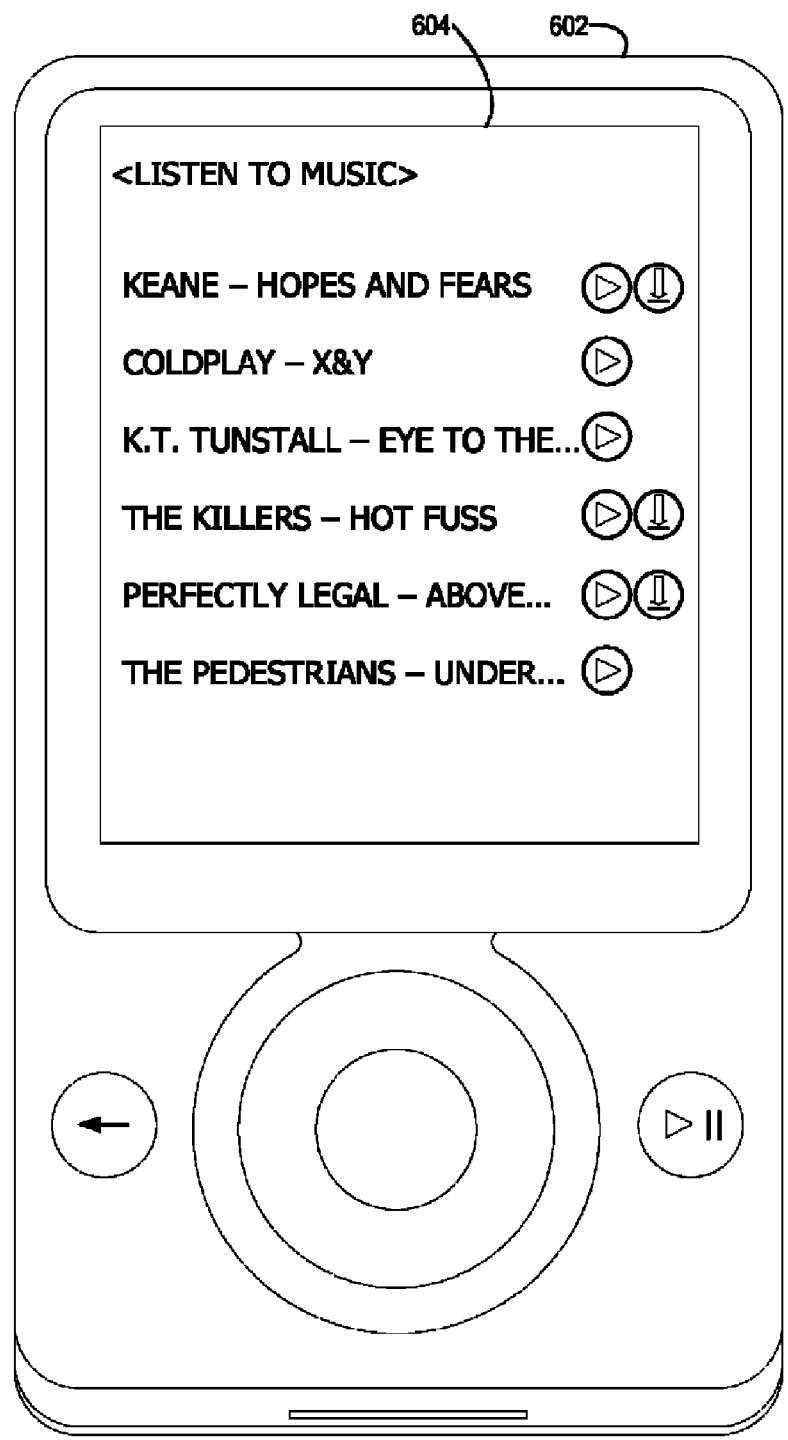
FIG. 6 is an exemplary embodiment of a computing device user interface identifying the media content items that are available to the computing device while in the local communication region.

Referring next to FIG. 6, an exemplary embodiment of a computing device 602 user interface 604 identifies the media content items that are available to the computing device 602 while in a local communication region. While the computing device 602 illustrated in FIG. 6 corresponds to a portable digital media player, the user interface 604 displayed therein is applicable to any computing device (e.g., mobile telephone, personal digital assistant, etc.).

After selection of a 'Listen to Music' service available in the local communication region (e.g., from a local media server such as in FIG. 1 or from a peer computing device such as in FIG. 5), the user interface 604 displays a list of the media content items that are available to the computing device 602. In the example of FIG. 6, the play icon or button (e.g., triangle within a circle) next to a particular media content item indicates that media content item is available for streaming and immediate rendering on the computing device 602. The download icon or button (e.g., arrow pointing down within a circle) next to a particular media content item indicates that a promotional copy of the media content item is available for downloading and storage on the computing device 602. When the user selects a media content item that has both icons, the user is given the choice of either streaming the media content item or copying the media content item to the device 602. If only one of the icons appears next to the media content item, the operation corresponding to the appearing icon is automatically selected (e.g., "X&Y" by Coldplay will automatically be streamed upon selection of this song by the user).

Referring next to FIG. 7, an exemplary screen shot of a user interface 702 illustrates media content items sorted according to flagged or non-flagged status. In particular, a flagged items filtered view is shown. The contents of the Action column include one or more of the following options shown in Table 3 below.

TABLE 3

Exemplary Actions to Perform on a Journal Entry.

| CONTENTS | DESCRIPTION |
|---|---|
| Download | Shown if the unique ID for the media content item is known, and the user does not already have a copy of the media content item. |
| Buy | Shown if the unique ID for the media content item is known, and the user has already downloaded the item. |
| Search | Shown if the media content item cannot be identified. Clicking on this button helps the user locate the media within the media service and/or other means (e.g., Internet search). |
| View Image | Shown if the media item is a valid image file. Clicking on the button opens the image. |
| In Library | Shown if the media item is already in the media library of the user. |

Figure 8:
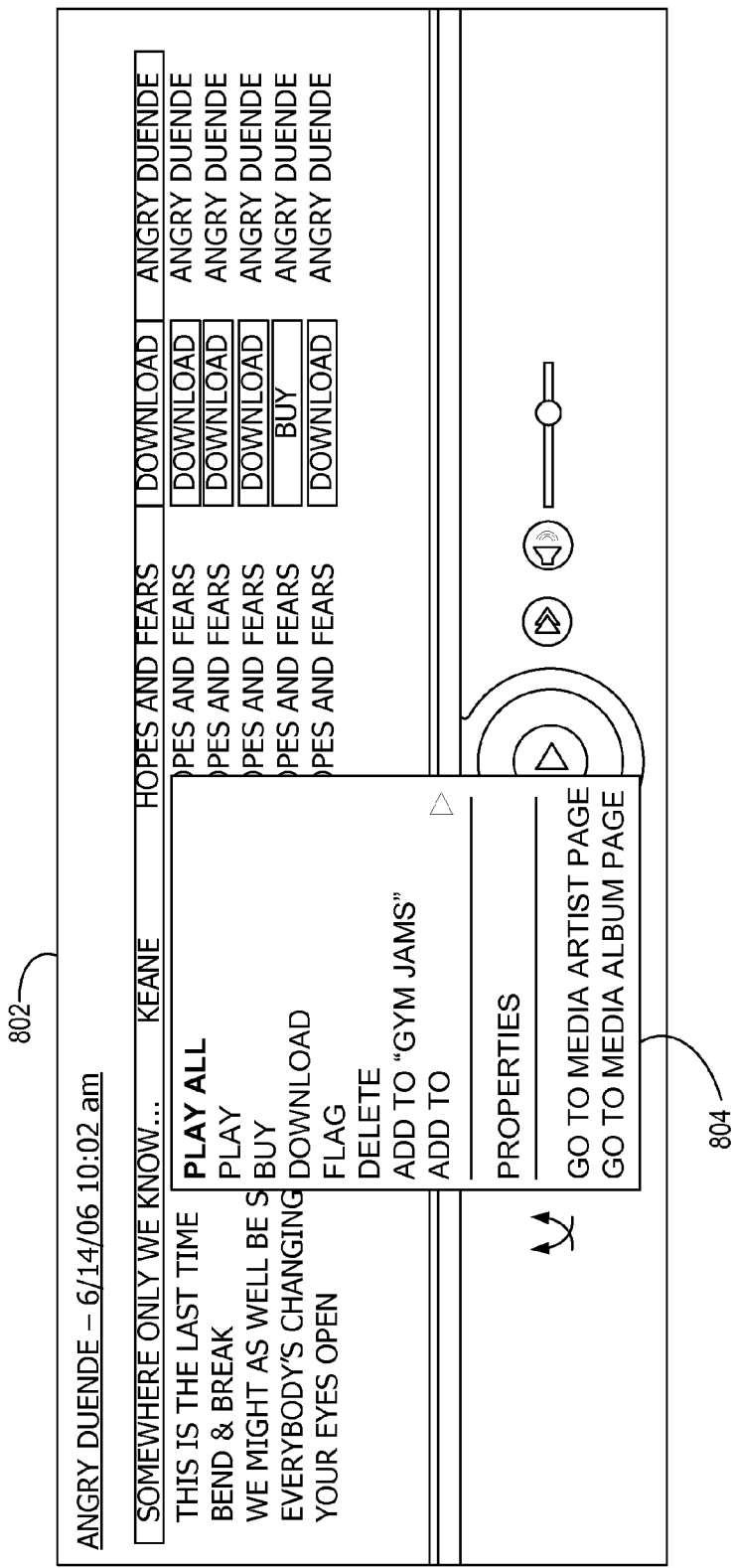
FIG. 8 is an exemplary screen shot of a user interface having a pop-up window illustrating the operations available to perform on a non-flagged media content item.

Referring next to FIG. 8, an exemplary screen shot of a user interface 802 includes a pop-up window 804 illustrating the operations available to perform on a non-flagged media content item. In an embodiment, the pop-up window 804 appears responsive to a right-click of a user interface selection device such as a mouse or touch pad while hovering over a particular journal entry in the user interface 802. The pop-up window 804 in FIG. 8 results from a user right-clicking a journal entry corresponding to a media content item that is not in the local media library but is available from the media service.

In one embodiment, the user has the capability of flagging any journal entry corresponding to a media content item that had been received or currently exists on the computing device. The flag acts as a reminder to take future action with respect to the media content item. Responsive to a request from the user to flag a particular journal entry, the user interface displays a flag near the particular journal entry or otherwise visually distinguishes the journal entry in the user interface 802.

Table 4 below describes the exemplary operations available within the journal for journal entries. The exemplary operations are shown, for example, when the right-clicking on a journal entry using a interface selection device such a mouse or touch pad.

TABLE 4

Description of Exemplary Operations on Journal Entries.

| OPERATION | DESCRIPTION |
| --- | --- |
| Play all | Add all of the media content items to a 'Now Playing' list and begins playback |
| Play | Add the currently selected journal entry to 'Now Playing' list and beings playback |
| Buy | Initiate a purchase of the media content item(s) corresponding to the selected journal entry or entries from the media service |
| Download | Initiate a download of the media content item(s) corresponding to the selected journal entry or entries from the media service |

TABLE 4-continued

Description of Exemplary Operations on Journal Entries.

| OPERATION | DESCRIPTION |
| --- | --- |
| Flag | Add a flag to the selected journal entry |
| Remove Flag | Remove the flag from the selected journal entry |
| Delete | Delete the selected journal item and/or corresponding media content item |
| Add to current | Add the media content item corresponding to the selected journal entry to the current playlist |
| Add to | Show the user a list of playlists to which the journal entry may be added |
| Properties | Display the properties of the selected journal entry |
| Go to Artist page | Navigate the user to the artist page in the media service |
| Go to Album page | Navigate the user to the album page in the media service |
| Search | Search for the media content item associated with the selected journal entry |

The search operation is available for journal entries corresponding to media content items that cannot be identified. In an embodiment, the search operation is performed by searching a media catalog associated with the media service. If a single result is returned, the content of the Action column in the user interface 802 for the journal entry is changed to Download or Buy. If two or more results are returned, the user is prompted to select the proper result. If no results are returned, the user is directed to search other catalogs (e.g., via the Internet) for the media content item.

The operations available for each journal entry are based upon the media content item associated with the selected journal entry or entries. Table 5 below shows the availability of exemplary right-click states for a journal entry.

TABLE 5

Exemplary Right Click States Available in the Journal.

| | IDENTIFIED CONTENT (NOT IN LIBRARY OR USER NOT SIGNED IN TO MEDIA SERVICE) | IDENTIFIED CONTENT (IN LIBRARY) | UNIDENTIFIED CONTENT | PICTURES |
| --- | --- | --- | --- | --- |
| Play all | Available if item includes media | Available | N/A | Available |
| Play | Available if item includes media | Available | N/A | Available |
| Buy | Available if item includes media | Available | N/A | N/A |
| Download | Available if item includes media | N/A | N/A | N/A |
| Flag | Available if item is untagged | Available if item is untagged | Available if item is untagged | Available if item is untagged |
| Remove Flag | Available if item is tagged | Available if item is tagged | Available if item is tagged | Available if item is tagged |
| Delete | Available | Available | Available | Available |
| Add to "current playlist" | Available if item includes media | Available | Available if item includes media | Available |
| Add to | Available if item includes media | Available | Available if item includes media | Available |
| Properties | Available if item includes media | Available | Available if item includes media | Available |
| Go to Artist page | Available | Available | N/A | N/A |
| Go to Album page | Available | Available | N/A | N/A |
| Search | N/A | N/A | Available | N/A |

Figure 9:
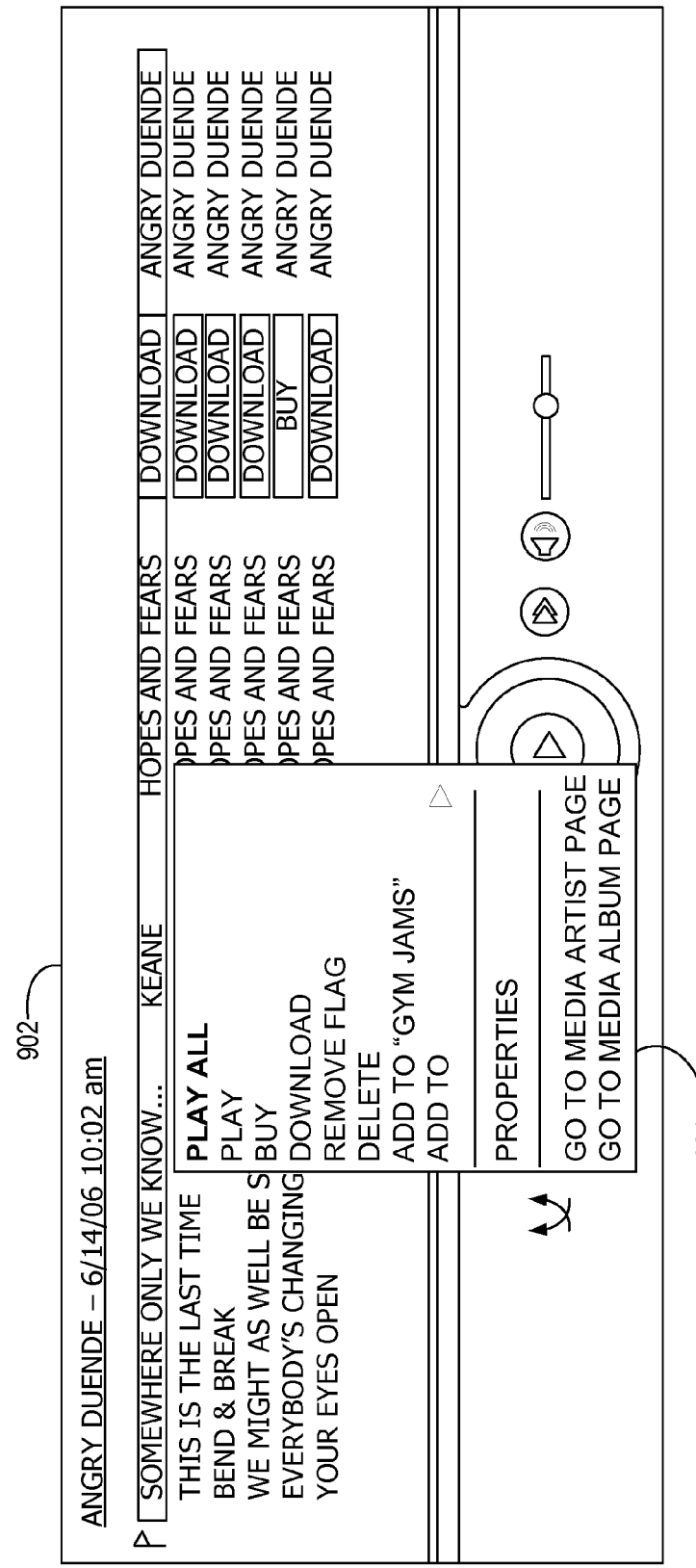
FIG. 9 is an exemplary screen shot of a user interface having a pop-up window illustrating the operations available to perform on a flagged media content item.

Referring next to FIG. 9, an exemplary screen shot of a user interface 902 includes a pop-up window 904 illustrating the operations available to perform on a flagged media content item. In this instance, the media content item corresponding to the selected journal entry is not in the local media library, but is available from the media service. The journal entry has been flagged. As such, the pop-up window 904 includes a "remove flag" operation.

Figure 10:
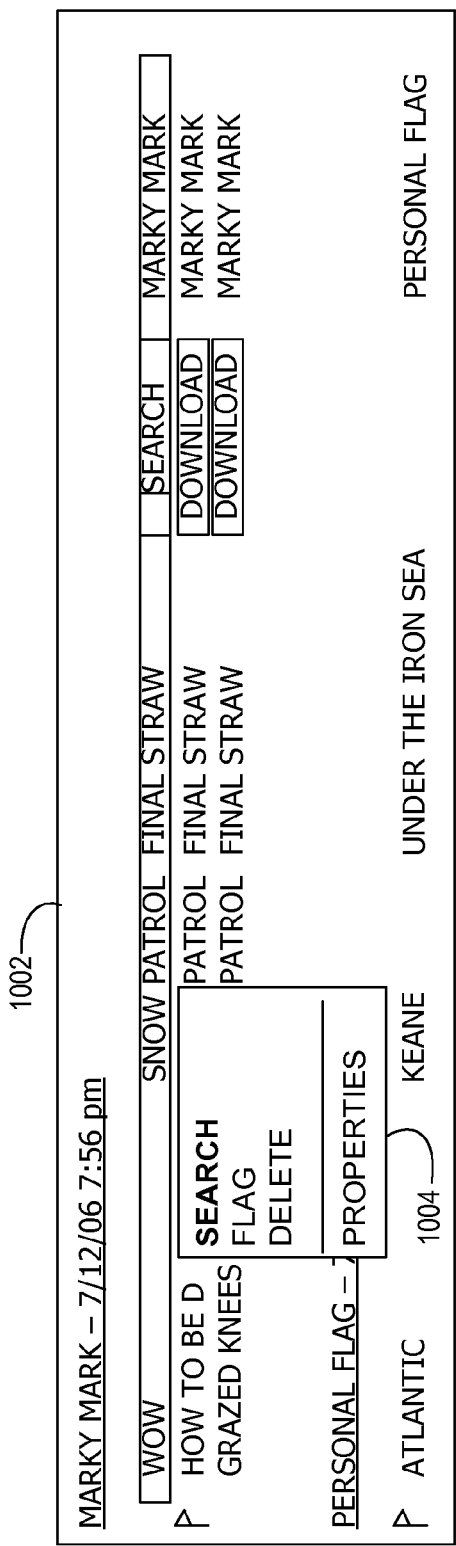
FIG. 10 is an exemplary screen shot of a user interface having a pop-up window illustrating a search operation available for a media content item for which a copy cannot be located.

Referring next to FIG. 10, an exemplary screen shot of a user interface 1002 includes a pop-up window 1004 illustrating a search operation available for a media content item for which a copy is not otherwise available. In this instance, the pop-up window 1004 results from the user right-clicking a journal entry that has not been flagged, and for which the corresponding media content item is not in the library and not available from the media service. The operations of Search, Flag, and Delete are available via the pop-up window 1004 along with an option to display the known properties for the journal entry.

The following examples further illustrate aspects of the invention. In a first example, the user receives streamed media content and subsequently purchases the streamed media content. In this example, the user connects the computing device to a local communication region at a coffee shop. The user views the selected services available at the coffee shop (e.g., "The Roasted Bean"). The user previews promotional content being streamed by coffee shop over the local communication region. Metadata describing the streamed, promotional media content is copied to the user's computing device along with an identifier associated with the coffee shop (e.g., "The Roasted Bean"). The user leaves the coffee shop, thereby disconnecting from the local communication region.

At home, the user connects the computing device to a personal computer that initiates a synchronization of the metadata from the computing device to the personal computer. After synchronization completes, the user opens a journal on the personal computer and navigates to the entry for the coffee shop. All the media content that was streamed to the computing device while at the coffee shop is listed with the option to purchase the streamed media content. The user selects a few of the media content items and purchases them. The purchase request, along with the identifier of the coffee shop, is sent to the media service. The media service identifies that "The Roasted Bean" coffee shop recommended the media content items to the user, and credits a portion of the sale to the account of the coffee shop. This account of the coffee shop may be related to the business subscription that the coffee shop has with the media service, or may be a separate rewards-style account associated with the coffee shop.

In another example, the user connects the computing device to a local communication region at a coffee shop. The user views the selected services available at the coffee shop (e.g., "The Roasted Bean"). The user selects to download promotional content available on the local communication region at the coffee shop. The content and associated metadata are copied to the user's computing device (e.g., to an inbox) along with an identifier associated with the coffee shop (e.g., "The Roasted Bean"). The user may only consume the downloaded promotional media content for a time period defined by the digital rights management policy associated with the downloaded promotional media content. After the time period expires, the copies of the downloaded promotional media content stored on the computing device are deleted from the computing device or otherwise rendered not playable. The metadata, however, remains on the computing device to enable the user to subsequently purchase the media content.

The user leaves the coffee shop, thereby disconnecting from the local communication region. Outside the local communication region (e.g., on a bus), the user browses the inbox on the computing device and opens the entry associated with "The Roasted Bean". The downloaded promotional media content is listed therein. The user selects a particular media content item and begins playback of the item.

At home, the user connects the computing device to a personal computer that initiates a synchronization of the metadata (but not the media content items) from the computing device to the personal computer. After synchronization completes, the user opens a journal on the personal computer and navigates to the entry for the coffee shop. All the media content that was copied to the computing device while at the coffee shop is listed with the option to purchase the downloaded media content. The user selects a few of the media content items and purchases them. The purchase request, along with the identifier of the coffee shop, is sent to the media service. The media service identifies that "The Roasted Bean" coffee shop recommended the media content items to the user, and credits a portion of the sale to the account of the coffee shop. As with the previous example, this account of the coffee shop may be related to the business subscription that the coffee shop has with the media service, or may be a separate rewards-style account associated with the coffee shop.

The following scenarios further illustrate operation of aspects of the invention. In a send and receive functionality scenario, TJ just bought the new Kean Album and ripped it into his media library. He then synchronizes his device with the PC media player that copies the album on to the device. Later that day TJ is at college and he bumps into his friend Dave who also happens to have a compatible device. TJ tells Dave that the new Kean Album is awesome and that he should listen to it so he sends Dave the tracks using the wireless send feature. After a few minutes, the send completes and Dave is able to listen to the Album.

Later on the same day, Dave comes home and docks his device with his PC media player client. After the synchronization completes he notices that the journal node shows that he has some new items. Dave clicks on journal and is pleased to see that the encounter he had with TJ is shown as well as all of media he received. As Dave liked the album so much he decides to click download. After a few minutes, Dave is pleased to see that he has the new Keane album in his library and starts to listen. While the tracks are playing Dave returns to the journal and deletes the entries from TJ as he no longer needs the entry.

In a flagging functionality scenario, TJ is listening to a new album on his device. During playback he hears a song he thinks his friend will like and decides to flag it to remind him to tell his friend about it the next time he sees him. Later on that day, TJ is at home and synchronizes his device with his PC media player client. As soon as the synchronization completes TJ notices that there are new journal entries showing and clicks on the Journal node. He then notices the "Personal Flag" he made earlier that morning which reminds him to send his friend an e-mail telling them about the track. After sending the e-mail, TJ deletes the entry from the journal.

The figures, description, and examples herein as well as elements not specifically described herein but within the scope of aspects of the invention constitute means for receiving the media content items and associated metadata from the content distribution device within the local communication region, and means for creating the journal on the journal computing device.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The word "exemplary" is intended to mean serving as an example, instance, illustration, or like. Any implementation or aspect thereof described herein as "exemplary" is not necessarily to be constructed as preferred or advantageous over other implementations or aspects thereof.

It will be further be understood that when on element is indicated as being responsive to another element, the elements may be directly or indirectly coupled.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for promoting the purchase of media content through documentation of community media encounters, said method comprising:

receiving metadata from a first computing device associated with a first user, said metadata describing at least one media encounter experienced by the first user, said media encounter comprising a communication between the first computing device and a second computing device during which one or more media content items were provided to the first computing device by the second computing device upon co-location of the first computing device and the second computing device, said co-location occurring when the first computing device and the second computing device exist within a local communication region based on predetermined relatable characteristics common to the first user of the first computing device and a second user associated with the second computing device, said metadata describing the media content items, wherein the first computing device is a portable communication device and the second computing device is a portable computing device associated with the second user;

creating a plurality of actionable elements based on the received metadata for association with each of the media content items provided to the first computing device by the second computing device during the communication, each of the actionable elements providing the user with a purchase opportunity for the associated media content item;

presenting the created, actionable elements to the user;

receiving a selection of one or more of the presented, actionable elements; and enabling the user to purchase the media content items corresponding to the received selection of actionable elements from the second computing device.

2. The method of claim 1, wherein the metadata describes a plurality of media encounters, and further comprising:

receiving a selection of one of the plurality of media encounters;

identifying media content items associated with the received selection of one of the plurality of media encounters; and providing to the user the identified media content items to enable the user to re-live the selected one of the plurality of media encounters.

3. The method of claim 1, wherein receiving the metadata comprises receiving a tag associated with one or more of the media content items, said tag indicating that the associated media content items are of interest to the user.

4. The method of claim 1, wherein the media content items were streamed by the second computing device to the first computing device during the communication.

5. The method of claim 1, further comprising enabling the user to search network locations for at least one of the media content items corresponding to the received selection of actionable elements is unavailable.

6. The method of claim 1, further comprising receiving a tag from the user for association with at least one of the presented, actionable elements.

7. The method of claim 1, wherein the media content items were provided to the first computing device by the second computing device based on evaluation of digital content distribution criteria associated with one or more of the first computing device and the second computing device.

8. The method of claim 1, wherein the created plurality of actionable elements corresponds to a journal.

9. The method of claim 1, wherein one or more computer-readable media have computer-executable instructions for performing the method recited in claim 1.

10. A method for documenting community media encounters, said method comprising:

receiving metadata from a first computing device associated with a first user, said metadata describing at least one media encounter experienced by the first user, said media encounter comprising a communication between the first computing device and a second computing device during which one or more media content items were streamed to the first computing device by the second computing device upon co-location of the first computing device and the second computing device, said co-location occurring when the first computing device and the second computing device exist within a sub-region of a local communication region, said co-location further based on predetermined relatable characteristics common to the first user of the first computing device and a second user associated with the second computing device, said metadata describing the media content items, wherein the first computing device is portable and the second computing device is a portable computing device associated with the second user;

creating records corresponding to the media content items based on the received metadata, wherein the records include the received metadata, and wherein the created records collectively form a journal of media encounters experienced by the user;

presenting to the user the journal of media encounters; and interacting with the user via the journal of media encounters to manipulate one or more of the media content items.

11. The method of claim 10, further comprising:

receiving a selection of the created records from the user; and rendering the media content items corresponding to the received selection of created records to the user.

12. The method of claim 10, wherein receiving the metadata comprises receiving a tag associated with one or more of the media content items, and further comprising visually distinguishing the created records corresponding thereto in the presented journal.

13. The method of claim 10, wherein each of the records has one or more actionable elements associated therewith.

14. The method of claim 10, wherein interacting with the user comprises:
    receiving a request from the user to sort the created records collectively forming the journal of media encounters;
    sorting the created records responsive to the received request; and
    presenting to the user the journal of media encounters having the sorted records therein.

15. The method of claim 10, wherein one or more computer-readable media have computer-executable instructions for performing the method recited in claim 10.

16. The method of claim 1, wherein the predetermined relatable characteristics comprise at least one of a zip code, gender, age, and preferences.

\* \* \* \* \*